US008535007B2

(12) United States Patent
Perkinson

(10) Patent No.: US 8,535,007 B2
(45) Date of Patent: Sep. 17, 2013

(54) HYDRAULIC ACTUATOR LOCKING DEVICE

(75) Inventor: Robert H. Perkinson, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 509 days.

(21) Appl. No.: 12/782,691

(22) Filed: May 18, 2010

(65) Prior Publication Data

US 2011/0286845 A1 Nov. 24, 2011

(51) Int. Cl.
*B64C 11/38* (2006.01)
*B63H 3/08* (2006.01)

(52) U.S. Cl.
USPC ................................ 416/153; 92/15; 188/166

(58) Field of Classification Search
USPC ..................... 416/153, 154, 156, 164; 92/15, 92/20
See application file for complete search history.

(56) References Cited

U.S. PATENT DOCUMENTS 2,337,613 A 12/1943 Martin
2,378,938 A 6/1945 McCoy
2,388,276 A 11/1945 McCoy
2,426,007 A 8/1947 Forsyth
2,636,566 A 4/1953 Jedrziewski
2,640,555 A 6/1953 Cushman
2,738,022 A 3/1956 Zwack
2,897,293 A 7/1959 Morgan et al.
2,910,126 A 10/1959 Jedrziewski
2,913,056 A 11/1959 Farkas
2,923,361 A 2/1960 Best
3,001,588 A 9/1961 Fischer
3,024,848 A 3/1962 Chilman et al.
3,068,943 A 12/1962 Fischer
3,170,521 A 2/1965 Gaubis et al.
3,212,586 A 10/1965 Barnes et al.
3,240,275 A 3/1966 Bennett
3,263,754 A 8/1966 Belliere
3,589,830 A 6/1971 Mogren et al.
4,061,440 A 12/1977 Belliere
4,753,572 A 6/1988 Kusiak
5,037,271 A 8/1991 Duchesneau et al.
5,042,966 A 8/1991 Schwartz et al.
5,131,115 A * 7/1992 Sarto ................................ 16/82
5,161,948 A 11/1992 Carvalho et al.
5,186,608 A 2/1993 Bagge
5,199,850 A 4/1993 Carvalho et al.
5,364,231 A 11/1994 Eick et al.
5,391,055 A 2/1995 Carvalho
5,462,410 A 10/1995 Smith et al.
5,568,844 A * 10/1996 Matsuki et al. ................. 188/68
5,713,338 A 2/1998 Wheeler
5,795,132 A 8/1998 Wheeler
5,865,599 A 2/1999 Pruden et al.
5,931,637 A 8/1999 Wheeler (Continued)

FOREIGN PATENT DOCUMENTS

GB 629540 9/1949

*Primary Examiner* — Edward Look
*Assistant Examiner* — Justin Seabe
(74) *Attorney, Agent, or Firm* — Carlson, Gaskey & Olds P.C.

(57) ABSTRACT

A hydraulic lock system includes a spring pack defined between a female spring support and a male spring support, the spring pack includes a multiple of serrated washers, each of which defines an inner diameter which is greater than a diameter of the actuator rod and an outer diameter greater than an inner diameter of the cylinder.

16 Claims, 5 Drawing Sheets

(56) References Cited

U.S. PATENT DOCUMENTS

| | | | |
|---|---|---|---|
| 6,425,788 | B1 | 7/2002 | Lindholm |
| 7,118,336 | B2 | 10/2006 | Waddleton |
| 7,677,492 | B1 | 3/2010 | Carter, Jr. et al. |
| 2007/0212220 | A1 | 9/2007 | Perkinson et al. |

* cited by examiner

BI-DIRECTIONAL LOCK

HYDRAULIC ACTUATOR LOCKING DEVICE

BACKGROUND

The present disclosure relates to a hydraulic system, and more particularly to a hydraulic actuator lock.

Linear hydraulic actuators include a piston and cylinder arrangement where differential pressure across the piston is operable to support an external load. A lock is often utilized to support the external load in the event of a hydraulic pressure loss.

SUMMARY

A hydraulic lock system according to an exemplary aspect of the present disclosure includes a cylinder which defines an axis and an actuator rod movable along the axis. A spring pack is defined between a female spring support and a male spring support. The spring pack includes a multiple of serrated washers, each of which defines an inner diameter which is greater than a diameter of the actuator rod and an outer diameter greater than an inner diameter of the cylinder.

A hydraulic lock system according to an exemplary aspect of the present disclosure includes a cylinder which defines an axis and an actuator rod movable along the axis. A female spring support is defined about the actuator rod, the female spring support defines a female frustroconical surface and a male spring support defined about the actuator rod, the male spring support defines a male frustroconical surface. A spring pack is defined between the female spring support and the male spring support.

A method of locking a hydraulic actuator according to an exemplary aspect of the present disclosure includes jamming a spring pack of a multiple of serrated washers which forms a frustroconical shape between an actuator rod outer diameter and a cylinder inner diameter, each of the multiple of serrated washers defines an inner diameter which is greater than a diameter of the actuator rod and an outer diameter greater than the cylinder inner diameter.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
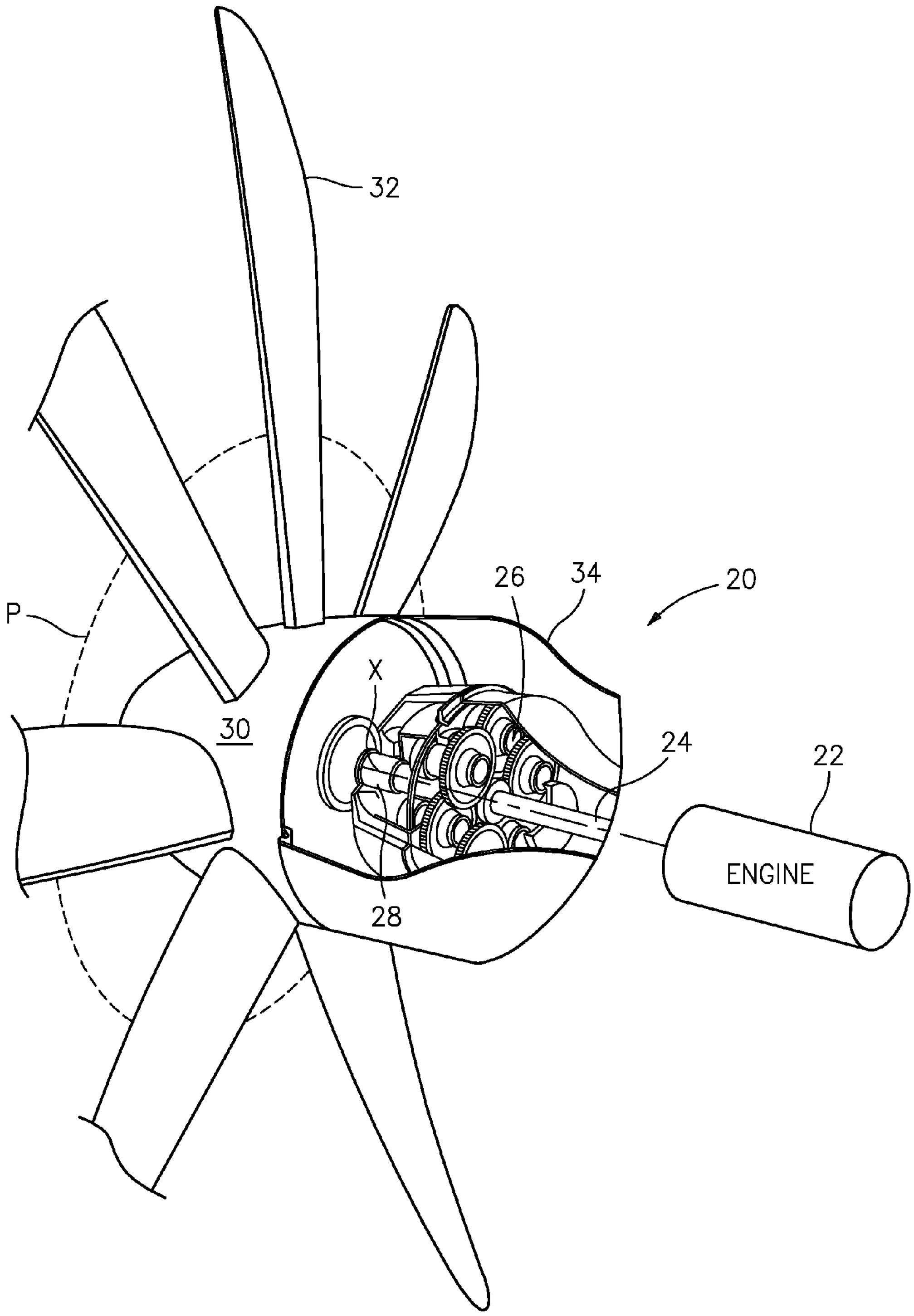
FIG. 1 is a general perspective view an exemplary gas turbine turboprop engine embodiment for use with the present application.

FIG. 1 schematically illustrates a propeller system 20 such as that for an aircraft. It should be understood that although a propeller system 20 typical of a turboprop aircraft is illustrated in the disclosed embodiment, various aircraft configurations and/or machines which utilize linear hydraulic actuators will benefit herefrom.

The propeller system 20 in one non-limiting embodiment is powered by a gas turbine engine 22 which rotates a turbine output shaft 24 at a high speed. The turbine output shaft 24 drives a gearbox 26 which in general decreases shaft rotation speed and increase output torque. The gearbox 26 drives a propeller shaft 28 which rotates a propeller hub 30 and a plurality of propeller blades 32 which extend therefrom. It should be understood that propeller blades 32 as utilized herein include various aerodynamic surfaces such as blades, rotors, prop-rotors and others. In the disclosed non-limiting embodiment, the turbine output shaft 24 and the propeller shaft 28 rotate about a common axis X. Axis X is substantially perpendicular to a plane P which is defined by the propeller blades 32.

The gearbox 26 is within a stationary reference frame while the propeller system 20 is within a rotating reference frame. That is, the gearbox 26 is fixed structure typically attached, for example to an airframe 34 while the propeller system 20 rotates relative thereto in a rotational reference frame.

Figure 2:
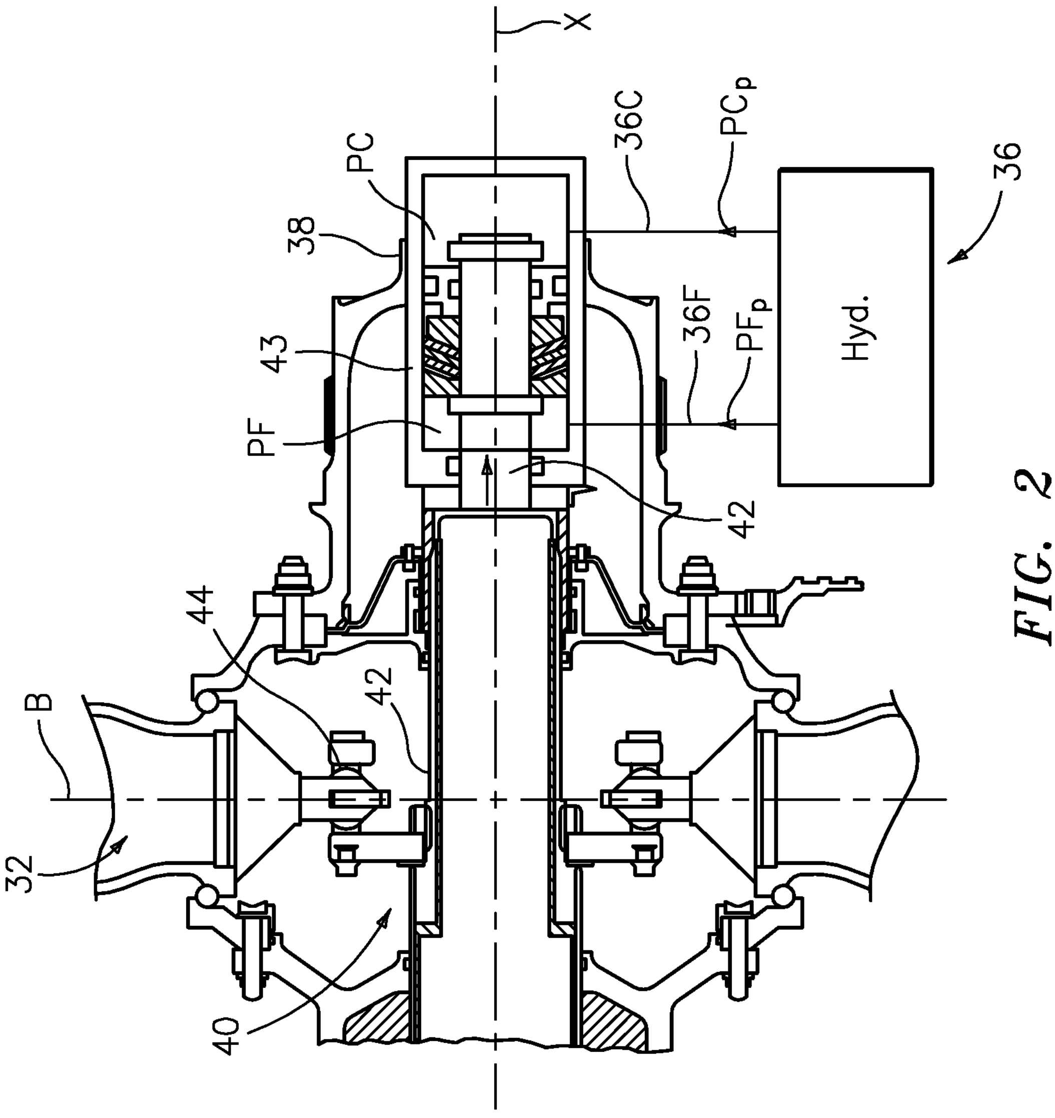
FIG. 2 is a schematic sectional view of the turboprop system illustrating an example hydraulic actuator system with a lock system.

With reference to FIG. 2, a hydraulic system 36 operable to actuate various mechanisms such as an actuator system 38. The actuator system 38 may be mounted along the hub axis X to drive a yoke assembly 40 through translation of a pitch change actuator 42 along axis X. The yoke assembly 40 is attached to a pitch trunnion pin 44 which extends from each propeller blade 32 to control the pitch thereof (illustrated schematically). That is, the yoke assembly 40 interfaces with the trunnion pin 44 at a pivot axis P which is offset from a blade axis B to convert axial motion of the yoke assembly 40 into pitch motion of each propeller blade 32. It should be understood that various linear hydraulic actuator arrangements may alternatively or additionally benefit herefrom.

It should be understood that under normal operational conditions, the actuator system 38 drives the actuator rod 42 within a cylinder 43 to move the yoke assembly 40 and pitch the propeller blade pitch propeller system 20. The cylinder 43 defines chambers PC, PF which are respectively supplied with coarse pitch pressure PCp and fine pitch pressure PFp from a coarse pitch pressure communication circuit 36C and a fine pitch pressure communication circuit 36F from the hydraulic system 36. Selective communication of coarse pitch pressure PCp and fine pitch pressure PFp to the actuator system 38 provides, for example, speed governing, synchrophasing, beta control, feathering, unfeathering as well as other control of the propeller blades 32. It should be understood that the hydraulic system 36 disclosed herein is illustrated schematically as various pressure communication circuits may be alternatively or additionally utilized herewith.

Figure 3:
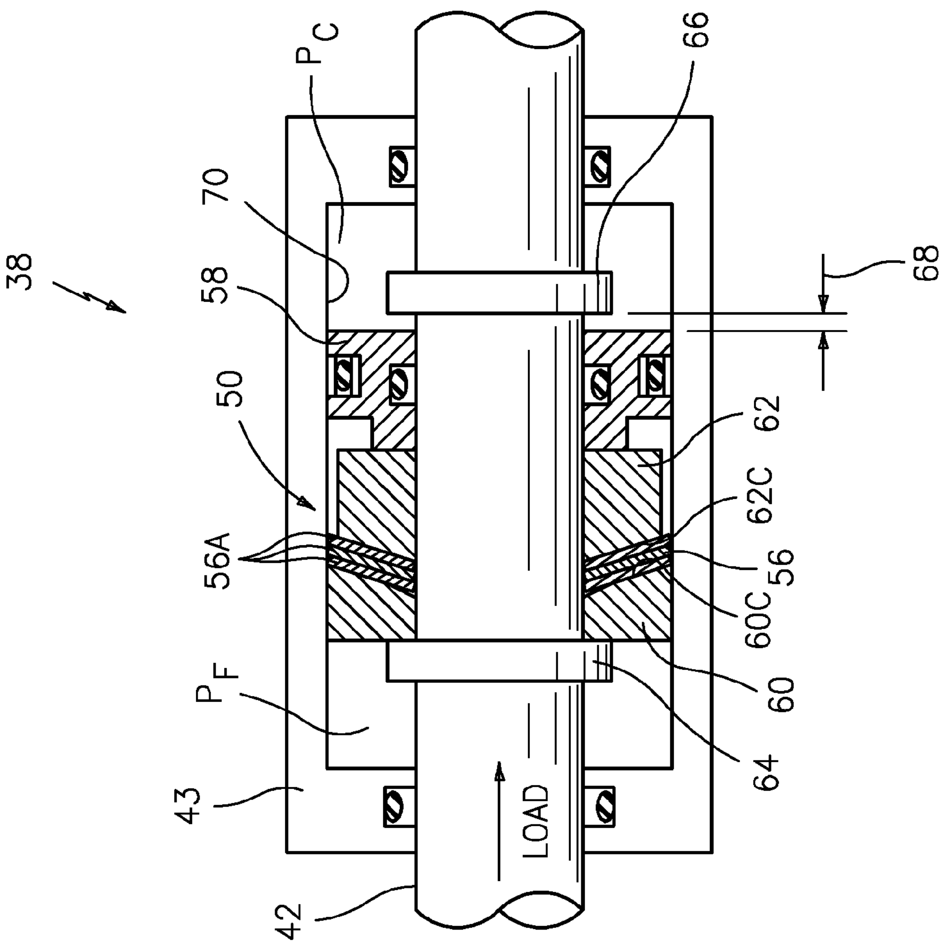
FIG. 3 is an expanded schematic sectional view of the hydraulic actuator system with a uni-directionally activatable lock system.

With reference to FIG. 3, the actuator system 38 includes a lock system 50. Although illustrated in the disclosed non-limiting embodiment as a pitch lock for the propeller system 20, it should be understood that the lock system 50 disclosed herein may be utilized in various linear hydraulic actuator systems in which a lock is required to support a load in the event of a hydraulic pressure loss.

The lock system 50 generally includes the actuator rod 42, the cylinder 43, a spring pack 56, which may include one or more springs, a piston 58, a female spring support 60 and a male spring support 62. The male spring support 62 may or may not be an integral part of the piston 58 as may be dictated by material selection, manufacturing and or assembly preferences. The lock system 50 operates in a unidirectional manner. That is, the load is only applied in one direction typical of a hydraulic linear actuator.

The actuator rod 42 defines a fine pitch abutment 64 and a coarse pitch abutment 66 which selectively interact with the female spring support 60 and the piston 58. The fine pitch abutment 64 and the coarse pitch abutment 66 may be lock rings axially fixed to the actuator rod 42 at an axial distance slightly greater than that provided by the spring pack 56, the piston 58, the female spring support 60 and the male spring support 62 axial length to define a gap 68. Gap 68 is sufficient to permit some axial free motion of the lock system 50 relative to the actuator rod 42 when, the lock system 50 locks.

Figure 4:
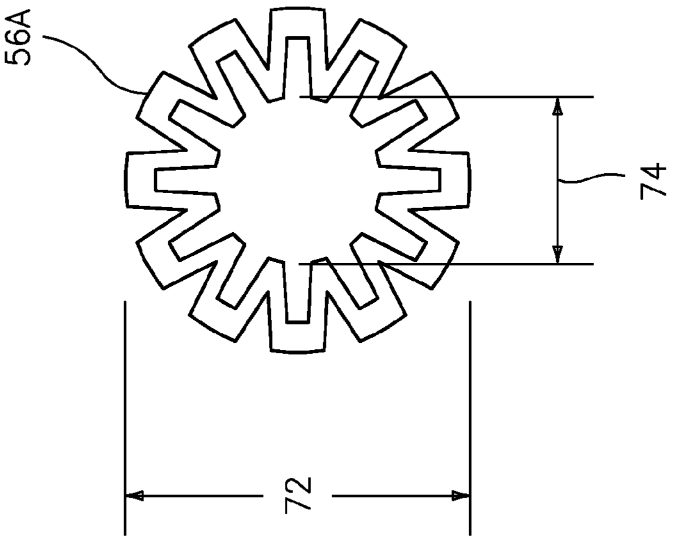
FIG. 4 is a face view of a spring, forming an element of a spring pack.
Figures 5A, 5B, 5C, 5D:
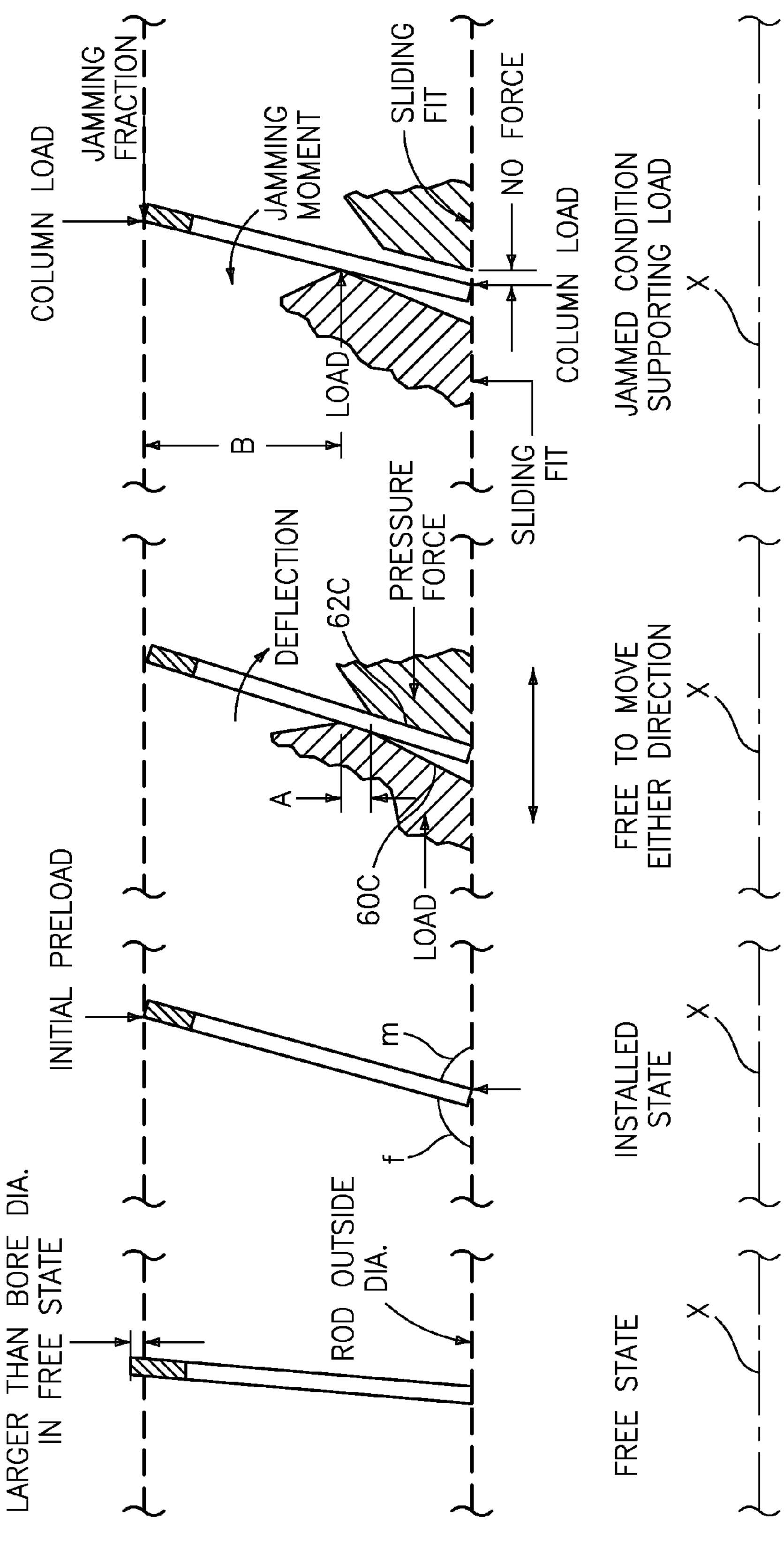
FIG. 5A is a sectional view of a spring in the spring pack in a free state condition.
FIG. 5B is a sectional view of a spring in the spring pack in an installed condition.
FIG. 5C is a sectional view of a spring in the spring pack in an inactivated condition.
FIG. 5D is a sectional view of a spring in the spring pack in a lock condition.

The spring pack 56 generally includes a series of springs 56A. Each spring 56A is a compact cylindrical spring which is generally in the shape of a serrated frustroconical washer (FIG. 4). That is, each spring 56A may have a slight conic in a free state (FIG. 5A). Each spring 56A of the spring pack 56 may be manufactured of a resilient material such as nylon or other material to include metallic material which minimizes scoring within a bore 70 of the cylinder 43. Each spring 56A is essentially a compression disc which provides an outer diameter 72 which defines an interference fit within the bore 70 and an inner diameter 74 which provides a slight clearance fit with the actuator rod 42.

The female spring support 60 and the male spring support 62 each define a respective frustroconical surface 60C, 62C to support the spring pack 56 therebetween. In one non-limiting embodiment, the frustroconical surface 60C of the female spring support 60 defines an angle just less than an installed obtuse angle (f) of the spring pack 56 and the frustroconical surface 62C of the male spring support 62 defines an angle just greater than the installed acute angle (m) of the spring pack 56 (FIG. 5B). The angle arrangement assures that force is applied generally adjacent the inner diameter of the spring pack 56 by the female spring support 60 and the male spring support 62 dependent upon the axial direction of the actuator rod 42.

In operation, the hydraulic system 36 provides differential pressure to the coarse pitch actuator chamber PC and the fine pitch actuator chamber PF to drive the piston 58, female spring support 60 and the male spring support 62 such that the lock system 50 is maintained in an inactivated condition (FIG. 5C). The spring pack 56 is maintained in an inactive deflected condition between the female spring support 60 and the male spring support 62 which are squeezed together to maintain the deflected position (FIG. 5C). That is, a distance A between the respective frustroconical surface 60C, 62C which contact the spring pack 56 to maintain the deflection.

In response to a release or loss of hydraulic pressure, the load on the actuator rod 42 will drive the actuator rod 42 to the right in the Figure. That is, gap 68 is sufficient to permit free motion of the actuator rod 42 when, for example, $PC_p$-$PF_p$ is equal to 50% of a minimum load to lock the lock system 50. This value being determined by design of the stiffness of the spring pack 56. The axial distance between the abutments 64, 66 permits the squeeze on the spring pack 56 to relax. The fine pitch abutment 64 will drive the female spring support 60 into the spring pack 56 which will jamb the spring pack 56 between the actuator rod 42 and the bore 70 to support the load in the absence of hydraulic pressure. The spring pack 56 is jammed because the squeeze force otherwise provided between the female spring support 60 and the male spring support 62 is relaxed due to loss of the hydraulic pressure. A distance B between the bore 70 and a point of contact 60A between the female spring support 60 and the spring pack 56 drives the spring pack 56 to the jamb position (FIG. 5D) which locks the lock system 50. The lock system 50 thereby advantageously supports the load in close proximity to the load position prior to loss of hydraulic pressure.

In response to return of hydraulic pressure the spring pack 56 is again squeezed between the female spring support 60 and the male spring support 62 to again place the spring pack 56 in the deflected inactivated position (FIG. 5C).

Figure 6:
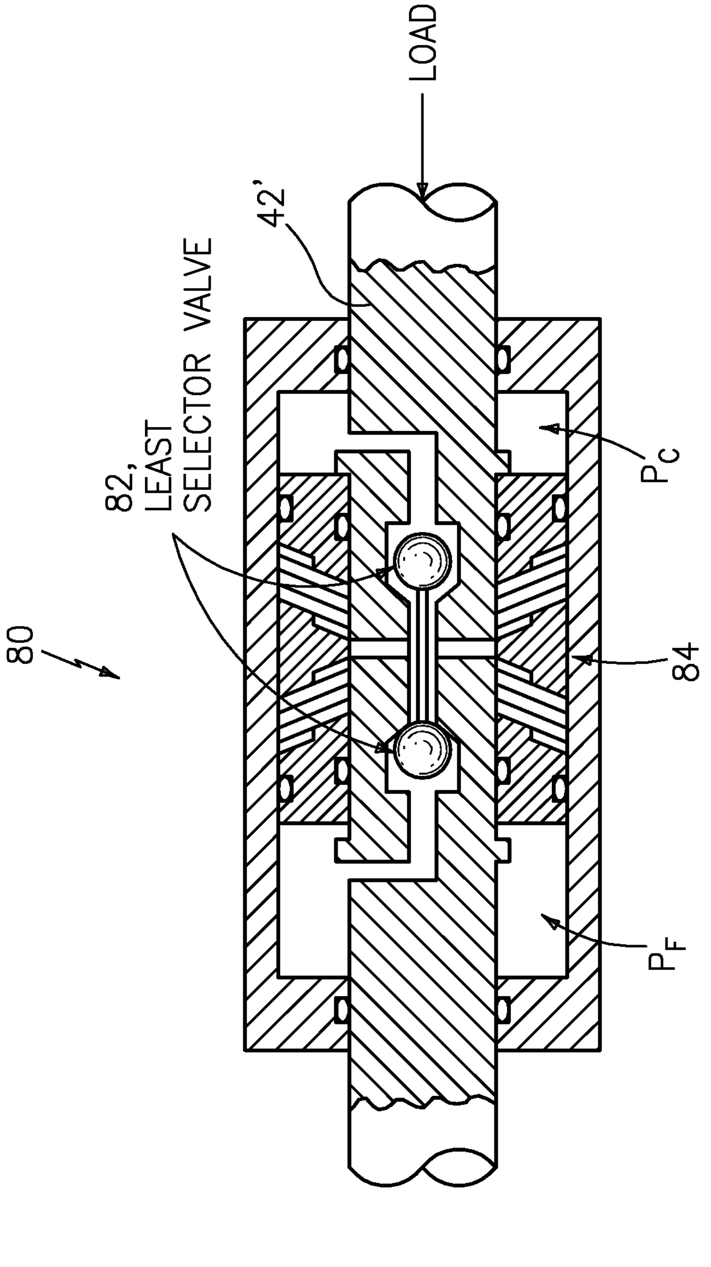
FIG. 6 is an expanded schematic sectional view of a hydraulic actuator system with a bi-directionally activatable lock system.

With reference to FIG. 6, another non-limiting embodiment of a lock system 80 provides for a bi-direction lock. The lock system 80 generally duplicates the unidirectional lock described above and operates in each direction generally as discussed above. A selector valve 82 located within an actuator rod 42' selectively maintains the lock system 80 in an inactivated state when adequate pressure is maintained in the coarse pitch actuator chamber PC and the fine pitch actuator chamber PF. The selector valve 82 supplies the lowest of the pressure within either the coarse pitch actuator chamber PC or the fine pitch actuator chamber PF to the center section of the piston assembly 84. In FIG. 6, the lock system 80 is shown with the fine pressure $PF_p$ greater than course pressure $PC_p$.

The present disclosure provide a linear hydraulic lock which is of a compact size and light weight that readily fits within an actuator system for operation without additional stroke length.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A hydraulic lock system comprising:

a cylinder which defines an axis;

an actuator rod movable along said axis;

a female spring support defined about said actuator rod;

a male spring support defined about said actuator rod; and a spring pack defined between said female spring support and said male spring support, said spring pack includes a multiple of serrated washers, each of said multiple of serrated washers defines an inner diameter which is greater than a diameter of said actuator rod and an outer diameter greater than an inner diameter of said cylinder.

2. The hydraulic lock system as recited in claim 1, wherein said female spring support defines a female frustoconical surface adjacent to said spring pack.

3. The hydraulic lock system as recited in claim 2, wherein said male spring support defines a male frustoconical surface adjacent to said spring pack.

4. The hydraulic lock system as recited in claim 3, wherein said female frustoconical surface defines an angle less than an installed obtuse angle of said spring pack and said male frustoconical surface defines an angle greater than an installed acute angle of said spring pack.

5. The hydraulic lock system as recited in claim 1, further comprising a first and second abutment axially fixed to said actuator shaft adjacent to said respective said female spring support and said male spring support.

6. A hydraulic lock system comprising:
a cylinder which defines an axis;
an actuator rod movable along said axis;
a female spring support defined about said actuator rod;
a male spring support defined about said actuator rod;
a spring pack defined between said female spring support and said male spring support, said spring pack includes a multiple of serrated washers, each of said multiple of serrated washers defines an inner diameter which is greater than a diameter of said actuator rod and an outer diameter greater than an inner diameter of said cylinder; and
wherein said hydraulic lock is a pitch lock of a propeller system.

7. A hydraulic lock system comprising:
a cylinder which defines an axis;
an actuator rod movable along said axis;
a female spring support defined about said actuator rod, said female spring support defines a female frustoconical surface;
a male spring support defined about said actuator rod, said male spring support defines a male frustoconical surface; and
a spring pack defined between said female spring and said male spring support, wherein said spring pack includes a multiple of serrated washers.

8. The hydraulic lock system as recited in claim 7, wherein each of said multiple of serrated washers defines an inner diameter which is greater than a diameter of said actuator rod.

9. The hydraulic lock system as recited in claim 8, wherein each of said multiple of serrated washers defines an outer diameter is greater than an inner diameter of said cylinder.

10. The hydraulic lock system as recited in claim 7, wherein each of said multiple of serrated washers defines an interference fit with an inner diameter of said cylinder and a clearance fit with said actuator rod.

11. The hydraulic lock system as recited in claim 7, wherein said spring pack includes a multiple of serrated frustoconical washers.

12. A hydraulic lock system comprising:
a cylinder which defines an axis;
an actuator rod movable along said axis;
a female spring support defined about said actuator rod, said female spring support defines a female frustoconical surface;
a male spring support defined about said actuator rod, said male spring support defines a male frustoconical surface;
a spring pack defined between said female spring support and said male spring support; and
a selector valve within said actuator rod.

13. A method of locking a hydraulic actuator comprising:
jamming a spring pack of a multiple of serrated washers which forms a frustoconical shape between an actuator rod outer diameter and a cylinder inner diameter, each of the multiple of serrated washers defines an inner diameter which is greater than a diameter of the actuator rod and an outer diameter greater than the cylinder inner diameter; and supporting a spring in said spring pack using a female spring support defined about the actuator rod on a first end and supporting said spring in said spring pack using a male spring support defined about the actuator rod on a second end.

14. The method as recited in claim 13, further comprising jamming the spring pack in a unidirectional manner.

15. A method of locking a hydraulic actuator comprising:
jamming a spring pack of a multiple of serrated washers which forms a frustoconical shape between an actuator rod outer diameter and a cylinder inner diameter, each of the multiple of serrated washers defines an inner diameter which is greater than a diameter of the actuator rod and an outer diameter greater than the cylinder inner diameter, wherein jamming said spring pack comprises jamming one of two spring packs in a bi-directional manner.

16. The method as recited in claim 13, further comprising jamming one of two spring packs in a bidirectional manner.

* * * * *